(12) United States Patent
Langer et al.

(10) Patent No.: US 7,131,332 B2
(45) Date of Patent: Nov. 7, 2006

(54) VIBROGUARD FOR MACHINE ELEMENTS

(75) Inventors: Götz Langer, Aachen (DE); Bernd Geropp, Aachen (DE); Hans Willi Kessler, Langerwehe (DE)

(73) Assignee: Fag Kugelfischer AG (DE)

( * ) Notice: Subject to any disclaimer, the term of this patent is extended or adjusted under 35 U.S.C. 154(b) by 0 days.

(21) Appl. No.: 10/533,681

(22) PCT Filed: Nov. 3, 2003

(86) PCT No.: PCT/DE03/03650

§ 371 (c)(1),
(2), (4) Date: May 26, 2005

(87) PCT Pub. No.: WO2004/042340

PCT Pub. Date: May 21, 2004

(65) Prior Publication Data

US 2006/0053886 A1    Mar. 16, 2006

(30) Foreign Application Priority Data

Nov. 5, 2002 (DE) ................ 102 51 782

(51) Int. Cl.
*G01N 29/14* (2006.01)
(52) U.S. Cl. ............ 73/593; 73/659; 73/660; 73/587; 702/56
(58) Field of Classification Search ........... 73/593, 73/659, 660, 587; 702/56
See application file for complete search history.

(56) References Cited

U.S. PATENT DOCUMENTS

| 3,731,541 A | * | 5/1973 | Rabek ................ 73/493 |
| 4,140,040 A | * | 2/1979 | Modrey ............... 411/45 |
| 4,808,069 A | * | 2/1989 | Bonner et al. ........ 415/160 |
| 5,691,707 A | | 11/1997 | Smith et al. |
| 6,236,328 B1 | | 5/2001 | Smith et al. |
| 2002/0000126 A1 | | 1/2002 | Barclay |
| 2004/0050163 A1 | * | 3/2004 | Komninos .............. 73/587 |

FOREIGN PATENT DOCUMENTS

EP    1211500 A1 * 6/2002

OTHER PUBLICATIONS

International Search Report for PCT/DE03/03650 dated Mar. 4, 2004.

* cited by examiner

*Primary Examiner*—Daniel S. Larkin
*Assistant Examiner*—Rose M. Miller
(74) *Attorney, Agent, or Firm*—Ostrolenk, Faber, Gerb & Soffen, LLP

(57) ABSTRACT

A measuring system for structure-born noise measurement of machine elements in machine housings. The measuring system is fixed to the machine housing via a lubrication hold opening. A mounting pin with a continuous bore hole. A housing receives a printed circuit board provided with electronic components for signal evaluation. A vibration snesor and vibration sensor housing rotationally mounted in relation to the mounting pin when the mounting pin is screwed into the lubrication hold opening. The vibration sensor housing is rotationally fixed to the machine housing in a non-positive fit via a metal bushing when the mounting pin is screwed in an end position. The vibration sensor is located adjacent to the metal bushing whereby structure-born noise is directly transferred from the machine housing to the vibration sensor via the metal bushing.

8 Claims, 1 Drawing Sheet

VIBROGUARD FOR MACHINE ELEMENTS

CROSS REFERENCE TO RELATED APPLICATION

The present application is a 35 U.S.C. §§ 371 national phase conversion of PCT/DE2003/003650 filed 3 Nov. 2003, which claims priority of German Application No. 102 51 782.7 filed 5 Nov. 2002. The PCT International Application was published in the German language.

FIELD OF THE INVENTION

The invention relates to a measuring system which is installed in a stationary manner on machine housings in order to register the machine vibrations (structure-borne sound) and/or the temperature continuously, in order to indicate changes or disturbances in the machine system in good time.

BACKGROUND OF THE INVENTION

In order to constantly monitor the condition of the machine, in particular the condition of the antifriction bearings in machines, measuring systems (vibration monitors) are arranged in a stationary manner on machines. For this purpose, these vibration monitors are screwed into the lubrication hole of antifriction bearing housings in order to register the machine vibrations in the immediate vicinity of the antifriction bearing. In order to permit relubrication of the antifriction bearings without dismantling the vibration monitor, the vibration monitor has a hollow mounting pin.

Such a measuring system is described, for example, in U.S. Pat. No. 6,236,328 B1. The problem with the vibration monitor shown there is that the printed circuit boards are connected directly to the mounting pin, and the vibration sensor is arranged on one of the printed circuit boards. As a result of the direct arrangement of the printed circuit boards on the mounting pin, all the vibrations of the machine system are transmitted to the bearing pin and therefore to the printed circuit boards. As a result of the direct fixing of the printed circuit boards to the mounting pin, the electronic components are highly loaded by the continuous vibrations (possible early failure of the components). The direct fixing of the printed circuit boards to the mounting pin firstly dampens the machine vibrations and, secondly, the printed circuit boards have an inherent vibration behavior, so that the vibration sensor on the printed circuit boards is able to pick up only damped or distorted vibrations. As a result of this damped or distorted sensing of the vibrations, the interpretation of the measured signal is extremely difficult and changes in the vibratory behavior of the machine can be registered only coarsely.

There is, therefore, the object of proposing a measuring system in which the vibration sensor can pick up the machine vibrations in undamped form and the printed circuit boards having the electronic components are largely protected with respect to the machine vibrations.

SUMMARY OF THE INVENTION

The core of the invention is that the vibration sensor is connected directly to the machine housing via a metal bushing, which is arranged outside the mounting pin. The printed circuit boards are mounted in a housing, which is arranged around the mounting pin via damping elements. The housing is connected to the metal bushing.

As the mounting pin is screwed into the lubrication hole opening in the accommodating machine housing, the housing and the vibration sensor housing can rotate freely around the mounting pin. The housing can thus be aligned as it is screwed in, so that, if appropriate, cable connections or optical indicating devices point in a specific direction. In this way, the machine operator or the maintenance personnel can read these indicating elements directly. When the mounting pin is tightened (in the end position), the metal bushing is pressed against the vibration sensor housing and in this way contact is made between the vibration sensor and the metal bushing. A direct connection for the structure-borne sound is thus created between machine housing, metal bushing and vibration sensor. At the same time, the housing of the measuring system is fixed in the end position by a force fit and so as to be secured against rotation.

BRIEF DESCRIPTION OF THE DRAWING

The invention will be explained by reference to FIG. 1, which shows an embodiment of the measurement system for a vibration monitor.

DETAILED DESCRIPTION OF THE DRAWING

Figure 1:
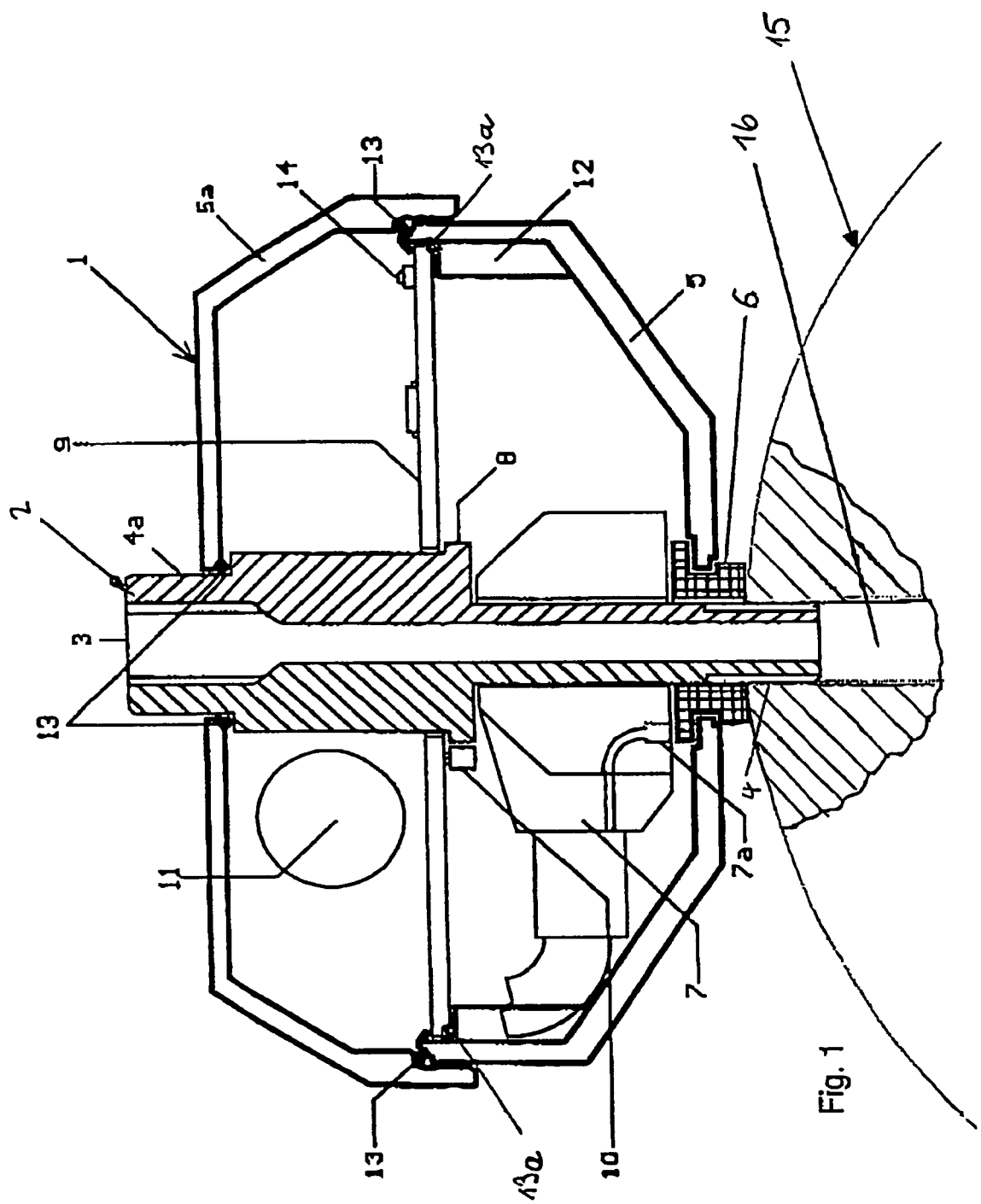

A vibration monitor or measuring system 1 is shown in FIG. 1. A mounting pin 2 is screwed via its thread 4 into a lubrication hole opening 16 of an accommodating machine housing 15. For this purpose, the mounting pin 2 is screwed in with a spanner size 4a. As the mounting pin is screwed in, the housing 5, 5a and the vibration sensor housing 7 can be rotated about the pin.

In the end position of the screwing-in of the mounting pin 2 a metal bushing 6 is then pressed against the vibration sensor housing 7 until the housing 7 comes to rest on the projection 8 of the mounting pin 2. The metal bushing 6 is additionally connected directly to the lower housing part 5 of the measuring system 1 so as to be fixed against rotation. After the mounting pin has been tightened, the lower part of the housing 5 is fixed on the machine housing by a force fit and so as to be secured against rotation. The upper housing part 5a is screwed to the lower housing part 5 and thus also fixed. The damping elements in the housing are designated by the reference number 13 and are located firstly between the two housing parts 5, 5a and secondly between the upper housing part 5a and the mounting pin 2. A further possibility is the arrangement of a damping element 13a (O-ring) between printed circuit board 9 and housing 5. The printed circuit board with the electronic components 9 is arranged within the lower housing part 5 and, in this example, is designed to be rotationally symmetrical in relation to the mounting pin 2. The printed circuit board is held by the lower housing part 5 and has no direct connection to the mounting pin 2. Provided on the printed circuit board 9 is a battery 11, which permits operation of this measuring unit without a cable connection. In addition, an aperture 12, through which a power supply via cable would also be possible, is provided in the lower housing part 5. In addition, in this example, a temperature sensor 10 is also provided, which is pressed against the mounting pin outside the printed circuit board. The battery 11 on the printed circuit board 9 can be changed by unscrewing the upper housing part 5a. The operating condition of the machine system is indicated to the operator or to the maintenance personnel via light-emitting diodes 14, which are arranged on the printed circuit board 9. In order to be able to detect these two light-emitting diodes 14 from all sides, the upper housing part 5a is produced from a transparent plastic. Since the housing 5, 5a can be rotated with respect to the mounting pin as the latter is tightened, it can be aligned in such a way that the cable 12 or the light-emitting diodes 14 are located such that they can be detected easily. The lubricating grease can get into the antifriction bearing housing from outside through the passage hole 3 of the mounting pin 2 without the measuring system having to be dismantled.

In this example, the housing 5, 5a of the measuring system 1, the vibration sensor housing 7, the printed circuit board 9 and the metal bushing 6 are designed to be rotationally symmetrical about the mounting pin.

The invention claimed is:

1. A measuring system for picking up structure-borne sound from machine elements in a machine housing wherein the machine housing has a lubrication hole opening; the measuring system comprising:
    a mounting pin to be fixed to the machine housing via the lubrication hole opening
    the mounting pin having a passage hole therethrough along a length of the pin for passage of lubricant through the pin into the lubrication hole opening,
    a housing to accommodate a printed circuit board therein; the mounting pin passing from the housing into the lubrication hole opening for mounting the vibration sensor housing to the machine housing,
    at least one printed circuit board having electronic components for signal evaluation and disposed in the housing,
    a vibration sensor housing, at least one vibration sensor in the vibration sensor housing arranged such that the sensor housing can be rotated with respect to the mounting pin as the mounting pin is screwed into the lubrication hole opening, the mounting pin being such that in the end position of the screwing-in of the mounting pin, the vibration sensor housing is connected to the machine housing via a bushing with a force fit and so the vibration sensor housing is thereby secured against rotation and the vibration sensor is adjacent to the bushing, whereby structure-borne sound is transmitted directly from the machine housing to the vibration sensor via the bushing.

2. The measuring system as claimed in claim 1, further comprising a temperature sensor for registering the temperature of the machine housing.

3. The measuring system as claimed in claim 1, wherein the housing has a lower portion and the bushing is connected to the lower portion of the vibration sensor housing to secure the vibration sensor against rotation with respect to the mounting pin.

4. The measuring system as claimed in claim 3, wherein the vibration sensor housing and the mounting pin are so configured that as the mounting pin is screwed into the lubrication hole opening, the housing may be rotated with respect to the mounting pin, and in the end position of the screwing-in of the mounting pin, the vibration sensor housing is connected to the machine housing via the bushing with a force fit to secure the vibration sensor housing against rotation.

5. The measuring system as claimed in claim 1, further comprising damping elements between the printed circuit board and the mounting pin.

6. The measuring system as claimed in claim 1, further comprising at least one light-emitting diode arranged on the printed circuit board for indicating machine condition of the machine.

7. The measuring system as claimed in claim 1, wherein the bushing is of metal.

8. The measuring system as claimed in claim 1, wherein the vibration sensor rests on the bushing.

* * * * *